Patented Sept. 10, 1940

2,214,423

UNITED STATES PATENT OFFICE 2,214,423

PROCESS FOR PLUGGING FORMATIONS

William Bruce Lerch, Ted M. White, and Eugene J. Gatchell, Bartlesville, Okla., assignors to Phillips Petroleum Company, a corporation of Delaware No Drawing. Application May 26, 1938,
Serial No. 210,270

4 Claims. (Cl. 166—21)

This invention relates to a process for the plugging of underground formations particularly those encountered in drilling oil or gas wells.

The invention more particularly relates to the use of a liquid material which, after in place, will undergo condensation, association, polymerization, or other chemical reactions to form a product that is resinous in nature and highly insoluble that will prevent the flow of water, oil and/or gas from or into the formations into which the liquid material has been injected.

In the drilling of oil and gas wells, water formations are usually encountered during drilling and before the productive oil or gas horizon is contacted. It is required to run steel casing into the well to shut off these water formations but in many instances these waters are corrosive and in contacting the steel casing will soon corrode the same, allowing the encroachment of water into the well. Also after an oil or gas well is completed, bottom hole water may be entering the well bore from the producing formation. This water must be produced from the well bore along with the oil or gas and materially raises the lifting costs to get the oil to the surface of the ground as it cuts down the amount of oil which can be produced and further raises the treating cost of the oil when it arrives on the surface of the ground since the water must be removed from the oil before it can be processed.

The primary object of this invention is to introduce a liquid material into the formation desired to be plugged in such manner that by condensation, association, polymerization or other chemical reaction, a product resinous in nature will be formed in the formation thereby plugging the channels in the water bearing formation and prevent water from coming into contact with the casing when it is run into the well or entirely eliminating the need for running casing by plugging a water bearing formation.

The object of the invention is more specifically stated as relating to the plugging of underground formations by the insoluble resinous compounds produced by the action of sulphur monochloride upon unsaturated animal, vegetable or mineral oils.

Other objects and advantages will appear to those skilled in the art from a careful study of the description to follow.

It is a well established fact that sulphur monochloride reacts with unsaturated animal, vegetable or mineral oils to produce polymerized products which are resinous in nature and highly insoluble in water crude oil, brine or liquid hydrocarbons. The reaction proceeds very rapidly with undiluted reagents but it may be delayed if active ingredients are diluted with saturated hydrocarbons such as crude oil or distillate or with heavy organic solvents such as carbon tetrachloride. In a practical application of the invention, a highly unsaturated fish oil product was diluted with carbon tetrachloride and petroleum distillate. Sulphur monochloride was then added and the mixture was applied by established methods to an underground formation. The proportions of carbon tetrachloride and distillate (or crude oil) in the diluent may be varied to obtain the specific gravity necessary to suit the occasion. In most cases it is advisable to have the specific gravity of the mixture 1.20 and to obtain such a specific gravity the proportions would be:

| | Per cent |
|---|---|
| Fish oil | 5 |
| Sulphur monochloride | 5 |
| Carbon tetrachloride | 45 |
| Distillate | 45 |

The time required for the reaction to be completed is determined by the dilution of the reacting mixture. With the proportion given above, that time is extended over several hours or long enough to introduce the mixture into the well by established methods; pressure it into the formation where the reaction is to be completed and the resinous product formed in the pores of the rocks.

The application of the material to the well bore may be directly through the casing, tubing, bailer or any conventional method suitable for lowering the liquid into the well. If necessary pressure may be applied through the tubing by positive pump action after a wall packer has been set between the tubing and casing above the formation where treatment is desired. After sufficient liquid material has been added to the formation, a plug of suitable material may be used to separate the liquid material from the oil or water which will follow in the tubing to drive the liquid material out into the formation to be plugged and thus insure that the liquid material will not set up in the tubing. The pressure will be held on the formation until the liquid material has had plenty of time to form a solid impermeable product resinous in nature which thus plugs the formation.

In conclusion, our invention specifically relates to the use of liquid resin forming materials with the chemical reaction definitely controlled so as to produce a solid material resinous in nature within a controlled time limit so as to allow sufficient time to prepare and introduce the liquid material into a well before the same resinifies or solidifies. Certain chemical mixtures of materials which will react in this manner have been specifically mentioned but it is to be understood that other compounds or mixtures containing the same physical and chemical properties as those specifically mentioned will react in the same manner as those mentioned and that various changes in the concentration and amounts of materials used can be made without departing from the spirit of our invention or the scope of the subjoined claims.

We claim:

1. A method of plugging formations in wells comprising introducing into the formation to be plugged a liquid composition which consists of a mixture of unsaturated animal oil diluted with a saturated hydrocarbon and heavy organic solvent added to sulphur monochloride and allowing the same to solidify in the formation to form a plug resinous in nature.

2. A method of plugging formations in wells comprising introducing into the formation to be plugged a liquid composition which consists of a mixture of unsaturated animal oil diluted with petroleum distillate and carbon tetrachloride added to sulphur monochloride and allowing the same to solidify in the formation to form a plug resinous in nature.

3. A method of plugging formations in wells comprising introducing into the formation to be plugged a liquid composition which consists of a mixture of a highly unsaturated fish oil diluted with petroleum distillate and carbon tetrachloride added to sulphur monochloride and allowing the same to solidify in the formation to form a plug resinous in nature.

4. A method of plugging formations in wells comprising introducing into the formation to be plugged a liquid composition which consists of a mixture of 5% highly unsaturated fish oil diluted with 45% petroleum distillate and 45% carbon tetrachloride added to 5% sulphur monochloride and allowing the same to solidify in the formation to form a plug resinous in nature.

WILLIAM BRUCE LERCH.
TED M. WHITE.
EUGENE J. GATCHELL.